(12) United States Patent
Azekatsu et al.

(10) Patent No.: US 7,588,259 B2
(45) Date of Patent: Sep. 15, 2009

(54) REDUCTION GEAR AND VEHICULAR ACTIVE STABILIZER SYSTEM

(75) Inventors: Yoshitomo Azekatsu, Saitama (JP); Takehiko Hakui, Saitama (JP); Atsushi Yuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 11/981,802

(22) Filed: Oct. 31, 2007

(65) Prior Publication Data

US 2008/0150241 A1 Jun. 26, 2008

(30) Foreign Application Priority Data

Dec. 22, 2006 (JP) ............................. 2006-346612

(51) Int. Cl.
*B60G 21/055* (2006.01)
*F16H 1/28* (2006.01)

(52) U.S. Cl. ............................. 280/124.107; 280/5.502; 280/5.511; 280/124.106; 475/162

(58) Field of Classification Search .......... 280/124.106, 280/124.107, 5.502, 5.506, 5.507, 5.508, 280/5.511; 475/162, 173, 177, 335, 342, 475/903; 254/297, 344

See application file for complete search history.

(56) References Cited

U.S. PATENT DOCUMENTS 6,126,566 A * 10/2000 Kerr ............................ 475/173
6,425,585 B1    7/2002 Schuelke et al.

FOREIGN PATENT DOCUMENTS

| JP | 52-139860 | 11/1977 |
|----|-----------|---------|
| JP | 04-027615 | 1/1992 |
| JP | 2002-518245 T | 6/2002 |

* cited by examiner

*Primary Examiner*—Ruth Ilan
*Assistant Examiner*—Keith Frisby
(74) *Attorney, Agent, or Firm*—Carrier, Blackman & Associates, P.C.; Joseph P. Carrier; William D. Blackman

(57) ABSTRACT

A reduction gear includes a rotatable carrier, a ring gear rotatably fitted in an offset supporting hole in the carrier, and first and second sun gears having first and second outer teeth meshed with first and second inner teeth of the ring gear, respectively. The rotation of the carrier is reduced in speed and outputted as relative rotation of the first and second sun gears. Thus, it is possible to secure a large reduction ratio although in a small structure having a small number of components. Also, it is possible to change the reduction ratio by a slight design change of the number of teeth in one or both of the outer teeth of the first and second sun gears, thereby improving the versatility.

10 Claims, 6 Drawing Sheets

REDUCTION GEAR AND VEHICULAR ACTIVE STABILIZER SYSTEM

CROSS-REFERENCE TO RELATED APPLICATIONS

The present claims priority from Japanese patent application 2006-346612, filed 22 Dec. 2006. The entire disclosure of each of the referenced priority documents is incorporated herein by reference.

BACKGROUND OF THE INVENTION

1. Field of the Invention

The present invention relates to a reduction gear which outputs rotation of a carrier as relative rotation of first and second sun gears, and a vehicular active stabilizer system using the reduction gear.

2. Description of the Background Art

Japanese Patent Publication No. 2002-518245 discloses a device including a stabilizer whose opposite ends are connected to left and right suspension devices, and an actuator provided at an intermediate portion of the stabilizer. Left and right halves of the stabilizer are relatively twisted in opposite directions to control yaw moment of a vehicle. In this device, the actuator comprises three in-line-connected planetary gear mechanisms and a motor for inputting a driving force thereto.

Because the above conventional stabilizer is a type using a planetary gear mechanism as a reduction gear of an actuator, three planetary gear mechanisms are required to obtain a sufficient reduction ratio, leading to a problem that the number of components and cost are increased and the actuator becomes large. Also, in order to change the reduction ratio of the reduction gear of the actuator, a design change of the entire planetary gear mechanisms is required, leading to a problem of a further increased cost.

SUMMARY OF THE INVENTION

The present invention has been made in view of the above situation, and has an object to provide a small reduction gear which provides a large reduction ratio and facilitates a change of the reduction ratio.

To achieve the above object, according to a first aspect of the present invention, there is provided a reduction gear comprising: a carrier which is rotatable about a first axis and has a circular supporting hole defined about a second axis offset from the first axis; a ring gear which is rotatably fitted in the supporting hole of the carrier and has inner teeth on an inner peripheral surface thereof; a first sun gear which is rotatably supported about the first axis and has first outer teeth meshed with the inner teeth of the ring gear; and a second sun gear which is rotatably supported about the first axis and has second outer teeth meshed with the inner teeth of the ring gear, the number of the second outer teeth being different from that of the first outer teeth, wherein rotation of the carrier is outputted as relative rotation of the first and second sun gears.

With the first aspect of the present invention, the reduction gear includes: the rotatable carrier; the ring gear rotatably fitted in the offset supporting hole in the carrier; and the first and second sun gears having the first and second outer teeth meshed with the inner teeth of the ring gear, respectively. The rotation of the carrier is reduced in speed and outputted as relative rotation of the first and second sun gears. Thus, it is possible to secure a large reduction ratio although in a small structure having a small number of components. Also, it is possible to change the reduction ratio by a slight design change, e.g., changing the number of teeth in one of the outer teeth of the first and second sun gears, thereby improving the versatility.

According to a second aspect of the present invention, in addition to the first aspect, the reduction gear further comprises a bearing which is interposed between the carrier and the ring gear.

With the second aspect of the present invention, the bearing interposed between the carrier and the ring gear enables a smooth relative rotation therebetween.

According to a third aspect of the present invention, there is provided a vehicular active stabilizer system using the reduction gear according to the first or second aspect, and comprising: a left stabilizer half having an outer end adapted to be connected to a left suspension device and an inner end connected to the first sun gear; a right stabilizer half having an outer end adapted to be connected to a right suspension device and an inner end connected to the second sun gear; and a driving source for driving the carrier.

With the third aspect of the present invention, the reduction gear of the present invention is used in a vehicular active stabilizer system, wherein the outer ends of the left and right stabilizer halves are adapted to be connected to the suspension devices, and the inner ends thereof are connected to the first and second sun gears; the carrier is driven by the driving source to generate relative rotation having a reduced speed between the first and second sun gears; and the left and right stabilizer halves are relatively twisted and deformed to generate a roll moment.

A knuckle 11 of an embodiment corresponds to the suspension device of the present invention, an actuator 15 of the embodiment corresponds to the reduction gear of the present invention, a motor 16 of the embodiment corresponds to the driving source of the present invention, and a needle bearing 32 of the embodiment corresponds to the bearing of the present invention.

The above-mentioned object, other objects, characteristics, and advantages of the present invention will become apparent from a present exemplary embodiment, which will be described in detail below with reference to the attached drawings.

DESCRIPTION OF THE PRESENT EMBODIMENT

Figure 1:
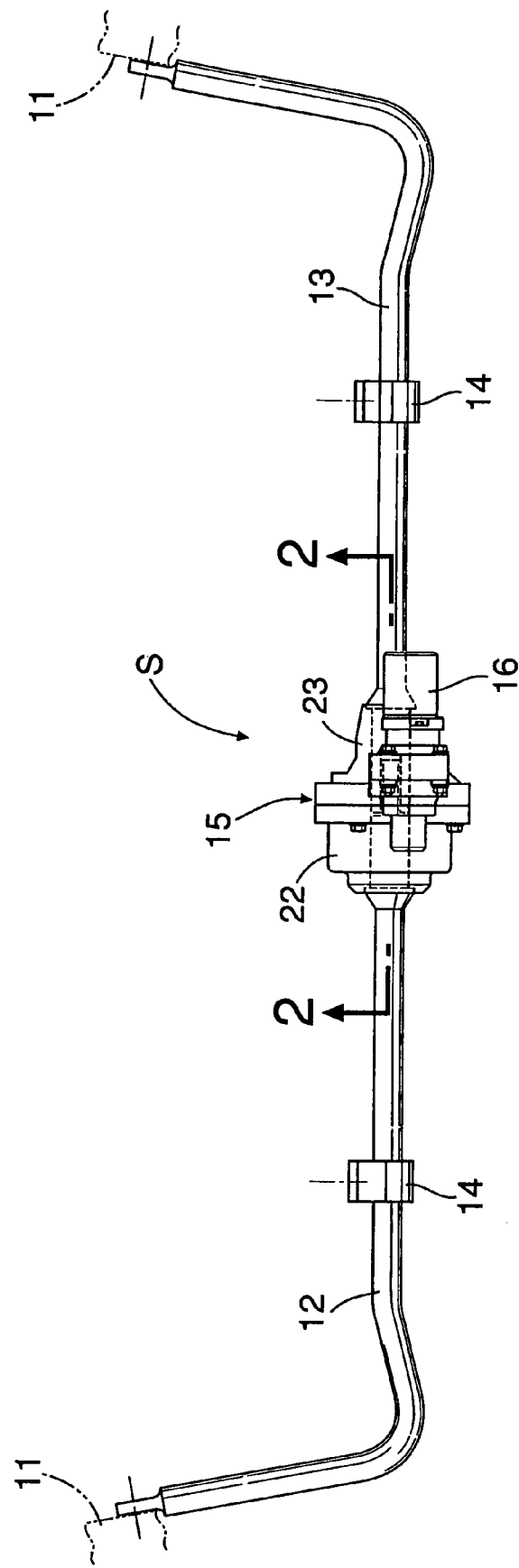
FIG. 1 is a plan view showing an active stabilizer system according an embodiment of the present invention.

As shown in FIG. 1, a vehicular active stabilizer system S is divided into two halves along at its center in the vehicle width direction, and includes: left and right stabilizer halves 12, 13 having outer ends which are respectively connected to knuckles 11 for rotatably supporting right and left wheels; left and right supporting brackets 14 for supporting the stabilizer halves 12, 13 on a vehicle body; and an actuator 15 for connecting the inner ends of the left and right stabilizer halves 12, 13 to each other, the inner ends being opposed to each other in the vehicle width direction. A motor 16 may be integrally provided with the actuator 15 so as to serve as a driving source for the actuator 15.

Figure 2:
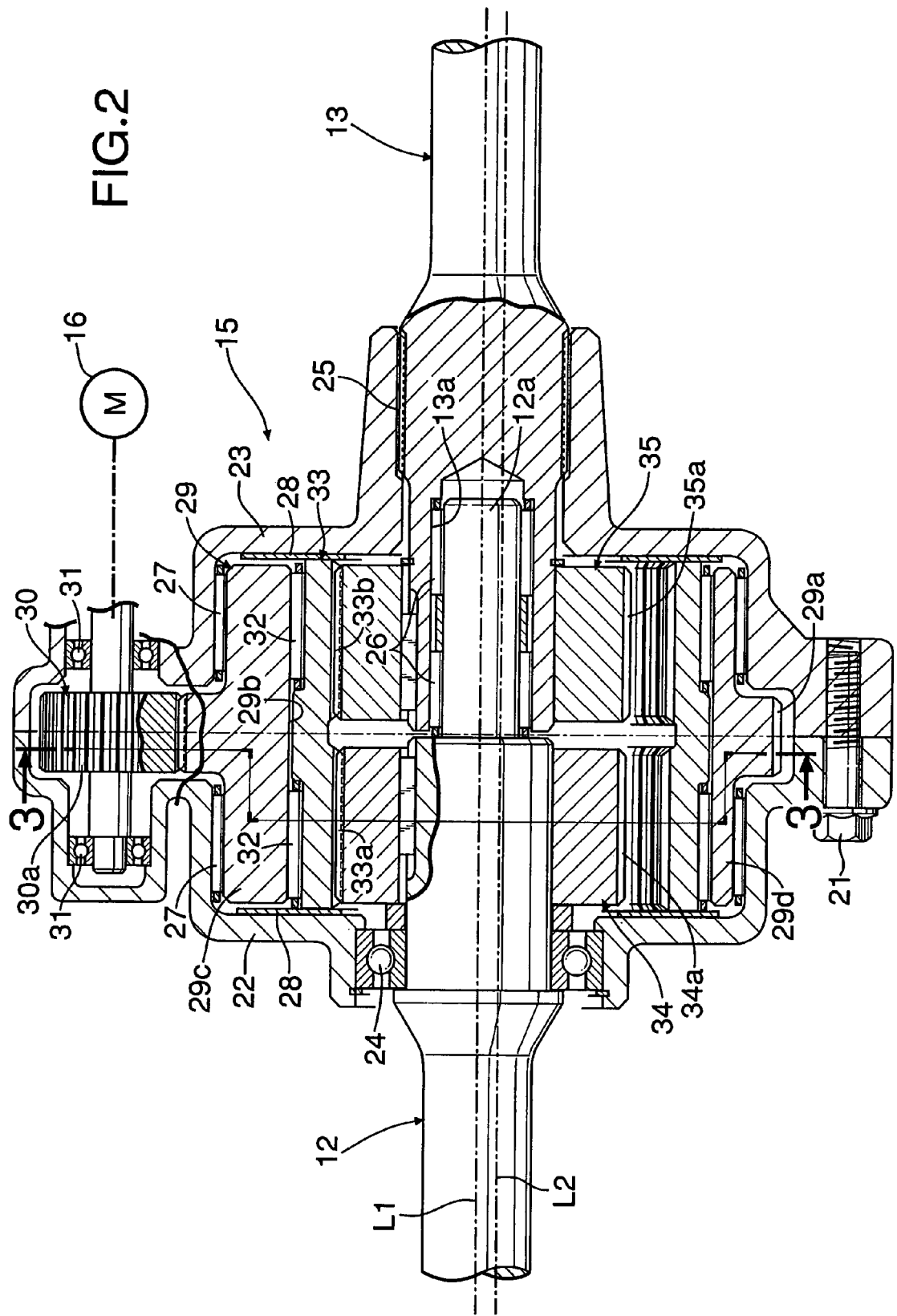
FIG. 2 is an enlarged sectional view taken along line 2-2 of FIG. 1.
Figure 3:
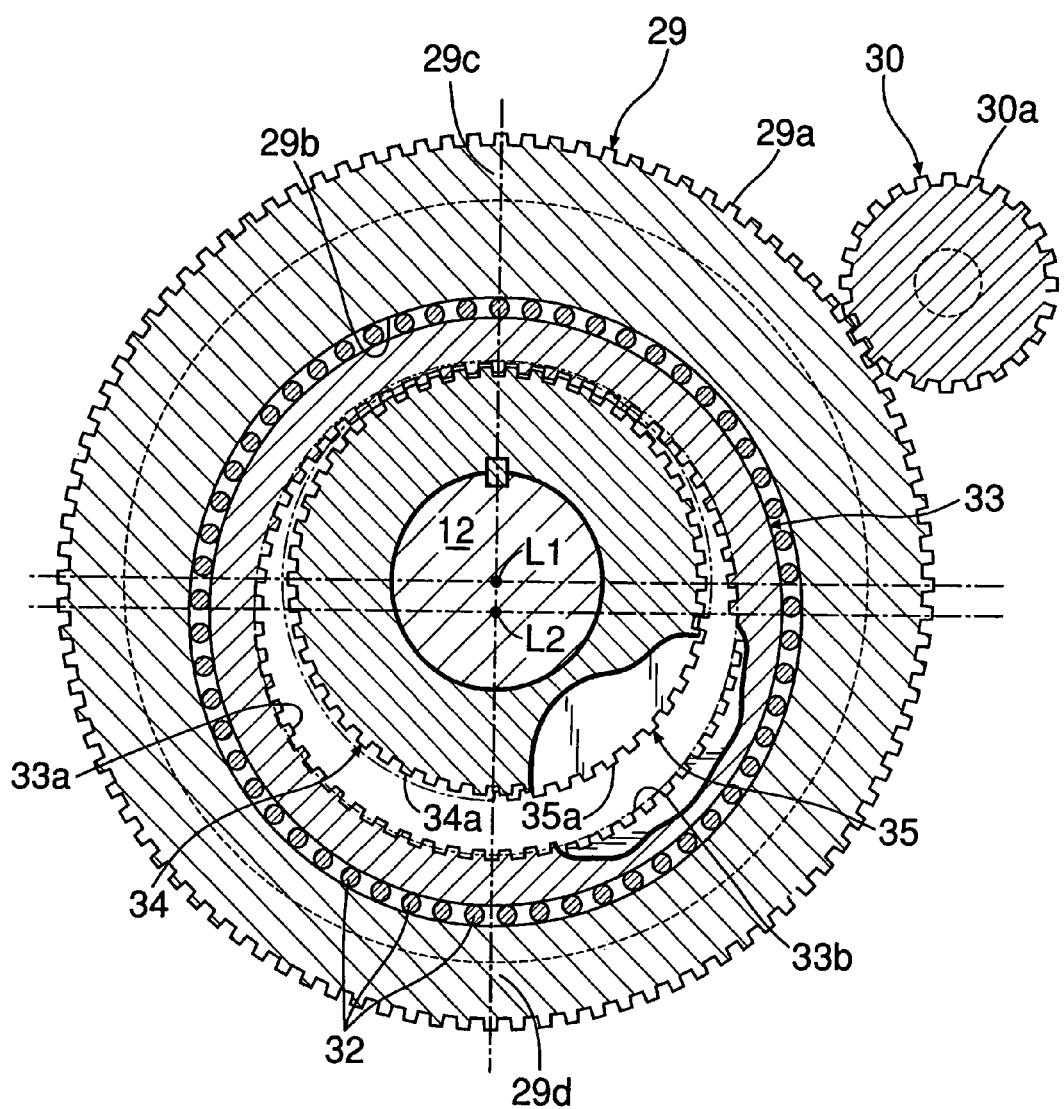
FIG. 3 is a sectional view taken along line 3-3 of FIG. 2.
Figure 4:
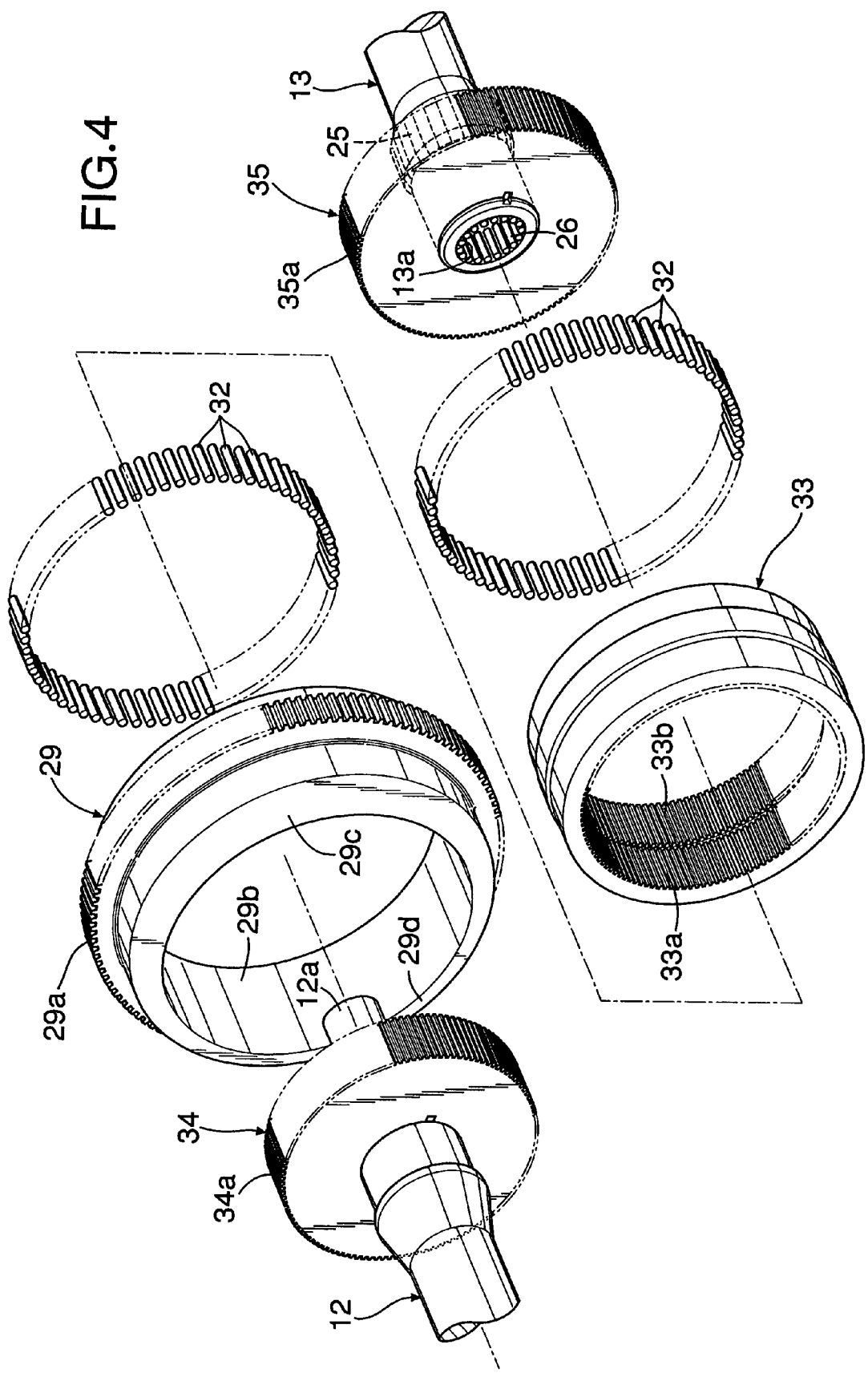
FIG. 4 is an exploded perspective view of an actuator of the embodiment of FIG. 1.

As shown in FIGS. 2 to 4, the actuator 15 includes a left housing 22 and a right housing 23 which are integrally coupled by a bolt 21. The left stabilizer half 12 is rotatably supported in the left housing 22 by a ball bearing 24. The right stabilizer half 13 is relatively non-rotatably coupled to the right housing 23 via a serration coupling 25. A small diameter portion 12a formed at a tip end of the left stabilizer half 12 is relatively rotatably fitted in an axial hole 13a formed at a tip end of the right stabilizer half 13, with two needle bearings 26 therebetween.

An annular carrier 29 is rotatably supported within the left and right housings 22 and 23 via a pair of needle bearings 27 and a pair of thrust sliding bearings 28. Assuming that the stabilizer halves 12 and 13 supported by the left and right housings 22 and 23 have a first axis L1 as a central axis of rotation, the carrier 29 has outer teeth 29a on its outer periphery around the first axis L1, and a pinion 30 has outer teeth 30a which are meshed with the outer teeth 29a and is rotatably supported in the left and right housings 22 and 23 via two ball bearings 31. The pinion 30 is coaxially connected to a rotation shaft for rotation of the motor 16 supported in the right housing 23.

The carrier 29 has an inner periphery forming a circular supporting hole 29b about a second axis L2 that is offset from the first axis L1. Thus, the carrier 29 includes a thick portion 29c having the maximum thickness in the radial direction and a thin portion 29d having the minimum thickness in the radial direction, with a phase difference of 180° therebetween. A ring gear 33 is rotatably provided on the inner periphery of the supporting hole 29b of the carrier 29 via two needle bearings 32. The needle bearings 32 allow the carrier 29 and the ring gear 33 to smoothly rotate relative to each other. Provided on the inner peripheral surface of ring gear 33 are first inner teeth 33a on the left side and second inner teeth 33b on the right side, which have different numbers of teeth. The ring gear 33 has a uniform thickness in the radial direction, and thus the first and second inner teeth 33a and 33b share a center on the second axis L2.

A first sun gear 34 is fixed to the left stabilizer half 12 in the left housing 22, and has first outer teeth 34a formed on its outer periphery so as to be meshed with the first inner teeth 33a of the ring gear 33. A second sun gear 35 is fixed to the right stabilizer half 13 in the right housing 23, and has second outer teeth 35a formed on its outer periphery so as to be meshed with the second inner teeth 33b of the ring gear 33. The number of the first outer teeth 34a of the first sun gear 34 is different from that of the second outer teeth 35a of the second sun gear 35.

The operation of the embodiment of the present invention having the above-described arrangement will now be described.

Figure 5:
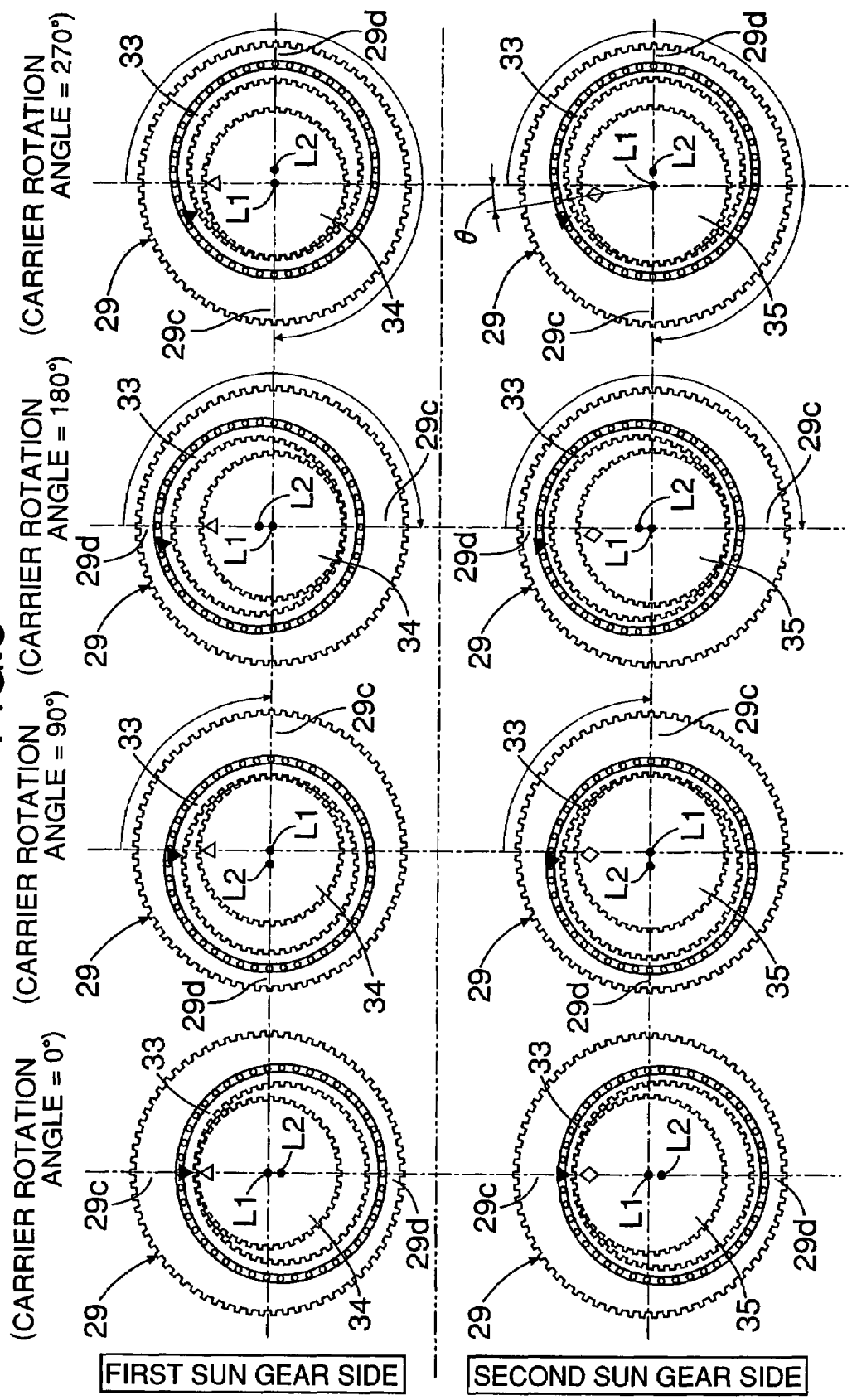
FIG. 5 is a view for explaining the operation of the actuator.

FIG. 5 shows views illustrating the operation of the embodiment where the motor 16 is driven in one direction while the first sun gear 34 is fixed (see the Δ mark), and the pinion 30 connected to the motor 16 rotates the carrier 29 clockwise by 270°.

First, reference is made on the behavior of the first sun gear 34 shown on the upper row in FIG. 5. When the rotational angle of the carrier 29 is zero, the thick portion 29c is positioned on the upper side in FIG. 5, and the outer teeth 34a of the first sun gear 34 are meshed with the first inner teeth 33a of the ring gear 33 on the upper side in FIG. 5. When the carrier 29 is rotated clockwise by 90°, the thick portion 29c is moved to rightward in FIG. 5, and the ring gear 33 is slightly rotated counterclockwise (see the ▼ mark) due to the difference between the number of the outer teeth 34a of the first sun gear 34 and the number of the first inner teeth 33a of the ring gear 33. When the carrier 29 is further rotated clockwise from 180° to 270°, the thick portion 29c is moved from the lower side to the left side in FIG. 5, so that correspondingly the ring gear 33 is further rotated counterclockwise (see the ▼ mark).

In the meantime, corresponding to the above-described clockwise rotation of the carrier 29, the second sun gear 35 having the outer teeth 35a meshed with the second inner teeth 33b of the carrier 29 is slightly rotated counterclockwise (see the ◇ mark) due to the difference between the number of the outer teeth 35a of the second sun gear 35 and the number of the second inner teeth 33b of the ring gear 33. Thus, the rotation of the carrier 29 by 270° generates a phase difference of an angle θ between the first sun gear 34 and the second sun gear 35.

The above description is based on the assumption for the sake of convenience that the first sun gear 34 is fixed, but even if the sun gear 34 is not fixed, the first sun gear 34 and the second sun gear 35 can be relatively rotated by an angle θ while the carrier 29 is rotated by 270°. Therefore, the left stabilizer half 12 and the right stabilizer half 13 can be relatively twisted in one or the other direction by a normal or reverse rotation of the carrier 29 by the motor 16, thereby vertically moving the left and right wheels in opposite phases to generate a roll moment. Conversely, if the motor 16 is electrically locked to prevent rotation, the left stabilizer half 12 and the right stabilizer half 13 become substantially integral to each other to function as a normal stabilizer, thereby vertically moving the left and right wheels in the same phase to control the rolling of the vehicle.

Figure 6:
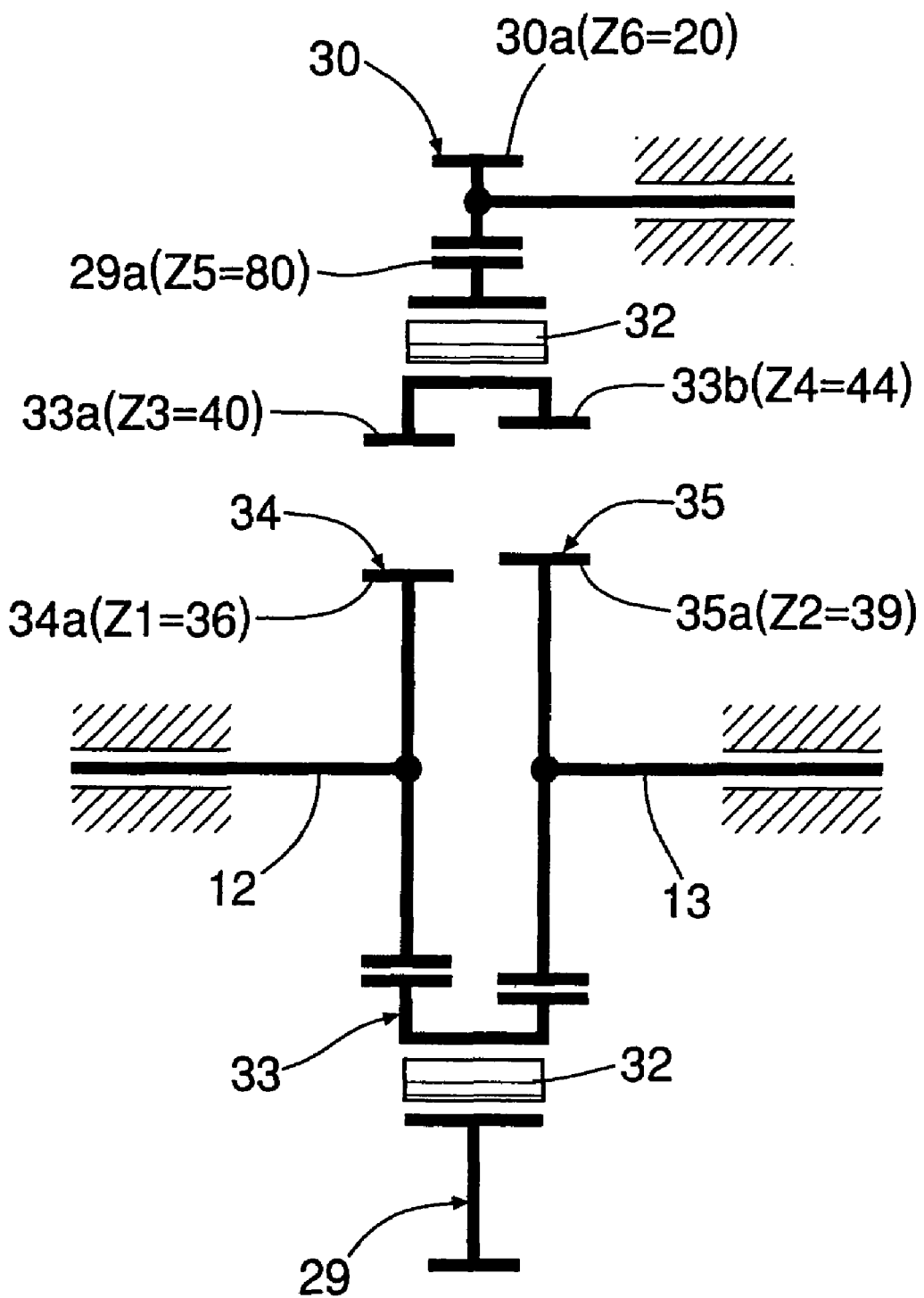
FIG. 6 is a view for explaining the relationship between reduction ratio and the number of teeth of each gear in the actuator.

As shown in FIG. 6, when each of the gears is provided so as to have the following number of teeth:

number $Z_1$ of the outer teeth 34a of the first sun gear 34=36;

number $Z_2$ of the outer teeth 35a of the second sun gear 35=39;

number $Z_3$ of the first inner teeth 33a of the ring gear 33=40;

number $Z_4$ of the second inner teeth 33b of the ring gear 33=44;

number $Z_5$ of the outer teeth 29a of the carrier 29=80; and number $Z_6$ of the outer teeth 30a of the pinion 30=20, a reduction ratio R1 of a first stage which is determined based on the number of teeth of the outer teeth 29a of the carrier 29 and the number of teeth of the outer teeth 30a of the pinion 30 is calculated as follows:

$$R1 = Z_5/Z_6 = 80/20 = 4$$

Also, a reduction ratio R2 of a second stage which is determined based on the number of teeth of the outer teeth 34a of the first sun gear 34, that of the outer teeth 35a of the second sun gear 35, that of the first inner teeth 33a of the ring gear 33, and that of the second inner teeth 33b of the ring gear 33 is calculated as follows:

$$\begin{aligned} R2 &= 1/\{1-(Z_3/Z_1)\times(Z_2/Z_4)\} \\ &= 1/\{1-(40/36)\times(39/44)\} \\ &= 66 \end{aligned}$$

Thus, a reduction ratio R3 which is a total of the reduction ratios R1 and R2 in the first and second stages is obtained as follows:

$$R3 = R1 \times R2 = 4 \times 66 = 264$$

When the number Z2 of the outer teeth 35a of the second sun gear 35 is changed from 39 to 40, the reduction ratio R2 is calculated as follows:

$$R2 = 1/\{1 - (Z3/Z1) \times (Z2/Z4)\}$$
$$= 1/\{1 - (40/36) \times (40/44)\}$$
$$= 99$$

Thus, the reduction ratio R3 which is a total of the reduction ratios R1 and R2 in the first and second stages is obtained as follows:

$$R3 = R1 \times R2 = 4 \times 99 = 396$$

That is, a mere change of the number of the outer teeth 35a of the second gear 35, among the first and second sun gears 34 and 35, increases the reduction ratio R2 of the second stage from 66 to 99, and increases the total reduction ratio R3 from 264 to 396, without changing the number of other gears or the number of their teeth. Thus, it is possible to change the reduction ratio at an remarkably low cost without a major design change of the actuator 15. Also, because the second sun gear 35 having the changed number of teeth is housed inside the supporting hole 29b of the carrier 29, the change in the number of teeth does not increase the outer dimensions of the actuator 15.

As described above, because the actuator 15 of the present embodiment has a small diameter but provides a large reduction ratio, it is possible to easily secure a space in an intermediate portion of the active stabilizer system S for mounting the actuator 15 therein. Also, even when the active stabilizer systems S are applied to both the front and rear wheels, or applied to different types of vehicles, change of reduction ratio is possible by a slight design change of the actuator 15, thereby improving the versatility and contributing to cost reduction.

The exemplary embodiment of the present invention has been described above, but various changes in design may be made without departing from the subject matter of the present invention.

For example, in the above embodiment, the actuator 15 is applied to the vehicular active stabilizer system S, but may be used as a reduction gear for any other application. That is, not only the rotation of the carrier 29 is reduced in speed and outputted as relative rotation of the first and second sun gears 34 and 35 as described in the above embodiment, but also other situations may be envisioned which can use a reduction gear according to the present invention in which the rotation of the carrier 29 is reduced in speed and outputted to one of the first and second sun gears 34 and 35 while the other sun gear being fixed.

Also, in the above embodiment, the first and second inner teeth 33a and 33b of the ring gear 33 have different numbers of teeth, but they may have the same number of teeth.

Further, in the above embodiment, the number of the outer teeth 34a of the first sun gear 34 is changed in order to change a reduction ratio, but the number of the outer teeth 35a of the second sun gear 35 or the numbers of both the outer teeth 34a and 35a of the first and second sun gears 34 and 35 may be changed instead.

Furthermore, in the above embodiment, the actuator 15 is provided in the intermediate portion of the stabilizer in the lateral direction, but may be provided at a position offset from the center to the left or right side of the vehicle.

What is claimed is:

1. A reduction gear comprising:
   a carrier which is rotatable about a first axis and has a circular supporting hole about a second axis offset from the first axis;
   a ring gear which is rotatably fitted in the supporting hole of the carrier and has inner teeth on an inner peripheral surface thereof;
   a first sun gear which is rotatably supported about the first axis and has first outer teeth meshed with the inner teeth of the ring gear; and
   a second sun gear which is rotatably supported about the first axis and has second outer teeth meshed with the inner teeth of the ring gear, the number of the second outer teeth being different from that of the first outer teeth,
   wherein rotation of the carrier is outputted as relative rotation of the first and second sun gears.

2. The reduction gear according to claim 1, further comprising a bearing which is interposed between the carrier and the ring gear.

3. The reduction gear according to claim 1, wherein the inner teeth of the ring gear include a first group of inner teeth which engage the first sun gear and a second group of inner teeth which engage the second sun gear, the number of said teeth in the first group being different than the number of said teeth in the second group.

4. The reduction gear according to claim 1, wherein the number of the inner teeth of the ring gear is different than the number of the first outer teeth of the first sun gear and different than the number of the second outer teeth of the second sun gear.

5. A vehicular active stabilizer system comprising:
   the reduction gear according to claim 1;
   a left stabilizer half having an outer end adapted to be connected to a left suspension device and an inner end connected to the first sun gear;
   a right stabilizer half having an outer end adapted to be connected to a right suspension device and an inner end connected to the second sun gear; and
   a driving source for driving the carrier.

6. The vehicular active stabilizer system according to claim 5, further comprising a bearing which is interposed between the carrier and the ring gear.

7. The vehicular active stabilizer system according to claim 5, wherein the inner teeth of the ring gear include a first group of inner teeth which engage the first sun gear and a second group of inner teeth which engage the second sun gear, the number of said teeth in the first group being different than the number of said teeth in the second group.

8. The vehicular active stabilizer system according to claim 5, wherein the number of the inner teeth of the ring gear is different than the number of the first outer teeth of the first sun gear and different than the number of the second outer teeth of the second sun gear.

9. The vehicular active stabilizer system according to claim 5, further comprising a housing for the reduction gear, one of said left and right stabilizer halves being rotatably supported in the housing and the other of said left and right stabilizer halves being relatively non-rotatably supported in the housing.

10. The vehicular active stabilizer system according to claim 9, wherein the driving source is provided integrally with the housing.

* * * * *